UNITED STATES PATENT OFFICE.

SAMUEL WETHERILL, OF BETHLEHEM, PENNSYLVANIA.

IMPROVEMENT IN THE MANUFACTURE OF GLASS.

Specification forming part of Letters Patent No. 30,439, dated October 16, 1860.

*To all whom it may concern:*

Be it known that I, SAMUEL WETHERILL, of the borough of Bethlehem, county of Northampton, in the State of Pennsylvania, have invented a new and useful improvement for the purpose of rendering glass a more perfect or neutral white, and thus increasing its ability to transmit light, of which the following is a specification.

The state of the art of glass-making at this time includes the use of oxides of lead, zinc, and manganese, or oxides of zinc and manganese, for the purpose of increasing the refractive power of glass, and thus by its analysis of light to secure that appearance known as "white glass." During this manufacture the zinc, from frequent melting—the change of condition consequent upon intensity of heat—partakes of yellow hue, which the manganese follows and corrects, and at the same time gives to the skin or surface of the glass a difference of quality for the transmission of light.

To enable others skilled in the art to make and use my invention, I therefore use, in combination with any of the above mixtures, slight portions of nickel or the oxide of nickel, thereby producing superior whiteness and greater brilliancy.

The proportions which I use as the most satisfactory in a pot or batch of two thousand pounds are prepared of a mixture of sand, six parts, by weight; oxide of zinc, four parts, by weight; soda, two parts, by weight, for two thousand pounds weight. Then add two pounds of white oxide of arsenic, twelve to fourteen pounds black oxide of manganese, and one-half to three-fourths ounce of the oxide of nickel. Glass made with oxide of zinc as a substitute for lead oxide is inclined to a straw tinge. Oxide of manganese in suitable proportions being added neutralizes the yellow, but at the same time destroys or tends to take away its power to transmit light by giving a dull-red shade to the mass, and, as the glass-makers say, destroys the skin or polished surface of the glass. The above proportion of oxide of nickel causes the glass to come out neutral in tint, and the skin or surface has a whiteness and brilliancy which greatly improves its appearance.

The use of the nickel is not to dispense with the use of manganese, but to use a less quantity to prevent the injury the manganese is liable to produce, and at the same time to give a better quality to the whole compound as to its power of transmitting light.

This improvement in quality is accompanied by a uniformity of character not attainable by the use of oxide of manganese and oxide of lead in glass-making.

What I claim as my invention, and desire to secure by Letters Patent, is—

The use of the oxide of nickel in the manufacture of glass, substantially in the proportions and manner and for the purpose herein set forth.

SAML. WETHERILL.

Witnesses:
G. S. J. FLUIHAR,
JAS. W. HALE.